United States Patent [19]

Fox et al.

[11] 4,248,754

[45] Feb. 3, 1981

[54] AQUEOUS DISPERSION OF POLYMERS CONTAINING POLAR GROUPS AND AMIDE GROUPS WITH POLY(ALKYLENE OXIDE)

[75] Inventors: Susan M. Fox, Cheltenham; David V. Gibson, North Bayswater, both of Australia

[73] Assignee: Dulux Australia Ltd, Melbourne, Australia

[21] Appl. No.: 967,254

[22] Filed: Dec. 5, 1978

[30] Foreign Application Priority Data

Dec. 23, 1977 [AU] Australia .............................. PD2887

[51] Int. Cl.$^3$ ............................................. C08L 33/26
[52] U.S. Cl. ............................ 260/29.6 E; 260/17 A;
260/29.6 NR; 260/29.6 HN; 260/29.6 H;
260/29.6 WB; 525/1; 525/258; 525/194;
526/200; 526/209; 428/522
[58] Field of Search .............. 260/29.6 NR, 29.6 WB,
260/29.6 HN, 29.6 H, 29.6 E, 29.6 CM

[56] References Cited

U.S. PATENT DOCUMENTS 3,839,500  10/1974  Dexter ......................... 260/29.6 WB Primary Examiner—Harold D. Anderson
Attorney, Agent, or Firm—Cushman, Darby & Cushman

[57] ABSTRACT

This invention relates to aqueous dispersions of synthetic polymer particles, particularly those used as film-forming media in surface coating compositions.

The problem of maintaining under moist conditions the adhesion to a substrate of a film formed from a surface coating composition having such an aqueous dispersion as a film former can be substantially overcome by using a dispersion wherein the film-forming polymer comprises (a) polar groups selected from amine, ureido and thioureido groups (b) a proportion of monomer units derived from acrylamide and methacrylamide, and (c) a proportion of poly(alkylene oxide). The proportions of these components present by weight of the film-forming polymer are at least 0.3% of (a), at least 0.3% of (b), at least 0.5% of (c) and from 1.4–9.0% of (a)+(b)+(c).

These aqueous polymer dispersions may be used in interior or exterior surface coatings.

7 Claims, No Drawings

AQUEOUS DISPERSION OF POLYMERS CONTAINING POLAR GROUPS AND AMIDE GROUPS WITH POLY(ALKYLENE OXIDE)

This invention relates to aqueous dispersions of synthetic polymers and more particularly to aqueous dispersions of addition polymers for use in surface coatings.

Aqueous dispersions of addition polymers are well known to the art and have been used for a number of years as film-forming media in paints and floor polishes, as adhesives and as conditioning agents for textiles. When a coating composition comprising an aqueous dispersion of such a polymer is applied to a substrate and allowed to dry, the disperse particles of polymer coalesce to form a continuous, tough, adherent film. The degree of adhesion of this film to the substrate and the extent to which this adhesion can be maintained are very much dependent on the nature of the substrate and on the conditions to which the film will be subjected. One combination of substrate and conditions which is especially harsh is also very common—the direct application of the coating to a cured paint composition, in particular a gloss alkyd paint, and subsequent exposure to moisture. This can occur, for example, in a kitchen, or, in the case of an exterior substrate, when the film is exposed to moisture, especially in the first few days after application. The ability of a coating composition to withstand such severe conditions can be assessed from a knowledge of its performance in various laboratory tests, for example, wet adhesion and humidity resistance (blistering) tests.

It has been found that significant improvements in moisture resistance properties can be made by the inclusion in some addition polymers of certain types of polar groups, and improved dispersions of this type have been described in, for example, Australian Pat. Nos. 290,025 and 403,662.

The fact that the addition of certain water-soluble moieties such as poly(ethylene oxide) to aqueous dispersions can considerably modify the rheology of such dispersions is known to and used by the art. An example of such a disclosure is Australian Pat. No. 482,559 which discloses the use of a water-soluble poly(ethylene oxide) as a rheology modifier in a thermosetting latex coating composition for use in metal decorating. However, it is also well known that the presence of such water-soluble moieties can severely impair moisture resistance properties. For example, in "Polymer Processes" (Vol. X of the "High Polymer" series) (Interscience, 1956) at page 107, Trommsdorff and Schildknecht teach that in general the presence of moieties such as the condensation products of ethylene oxide and oleic acid impairs the water resistance of films formed from such aqueous dispersions.

We have now made the surprising discovery that, contrary to the general teachings outlined above, certain water-soluble moieties can be used in a particular manner to enhance further the moisture resistance of certain polar group-containing addition polymer dispersions.

We therefore provide, according to the present invention, an aqueous dispersion of particles of at least one film-forming addition polymer of $\alpha,\beta$-ethylenically unsaturated monomer at least one of which polymers comprises a proportion of polar groups selected from amine, ureido and thioureido groups, and characterised in that (a) the polar groups are chosen as follows;
 (i) the amine groups correspond to the general formula

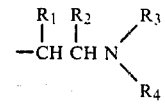

where $R_1$, $R_2$ are H, $CH_3$ or OH $R_3$, $R_4$ are H or $C_1$-$C_4$ alkyl or hydroxyalkyl groups;
 (ii) the ureido or thioureido groups are such that the solubility in water of a compound consisting of such a group attached directly to a methacrylyl group is at least 1% by weight at 25° C.;

(b) at least one film-forming addition polymer comprises a proportion of a copolymerisable amide monomer selected from acrylamide and methacrylamide; and (c) the film-forming polymer comprises a proportion of poly(alkylene oxide), the poly(alkylene oxide) being soluble in water and having at least 30 ethylene oxide units per molecule and further characterised in that (d) there is present in the film-forming polymer at least 0.5% by weight of the total film-forming polymer of the poly(alkylene oxide), at least 0.3% of the polar groups and at least 0.3% by weight of the amide monomer; and, (e) the combined weights of the poly(alkylene oxide), the polar groups and the amide monomer comprise from 1.4–9.0% by weight of the total film-forming polymer.

A poly(alkylene oxide) is an entity of formula

where the nature of R' depends on the type of monomer unit from which the poly(alkylene oxide) is formed. For example, if the unit is an ethylene oxide unit, R' will be $CH_2$. The identity of the terminal group R is usually determined by the choice of starting material from which the poly(alkylene oxide) is prepared. It can be, for example, a hydroxyl group or an alkoxy group. One class of materials which do not work in our invention are commercially-available surfactants wherein R is an alkyl phenoxy or long chain alkyl group and these materials are specifically excluded from our invention. For best results, we have found that R should preferably be an alkoxy group of from one to four carbon atoms or more preferably a hydroxyl group. For the working of our invention, the poly(alkylene oxide) must comprise on average at least 30, and preferably at least 50, ethylene oxide units per molecule and it must be water-soluble. In practice, the requirement of water solubility means that the poly(alkylene oxide) chain will consist predominantly of ethylene oxide units but minor proportions of other alkylene oxide units can be tolerated, for example propylene oxide can be incorporated in quantities of typically 10% by weight.

The film-forming addition polymer comprising the particles of the aqueous dispersions of this invention may be prepared from any of the $\alpha,\beta$-ethylenically unsaturated monomers known to and used by the art for the purpose of making such aqueous dispersions. Typical examples of suitable monomers are styrene, vinyl acetate, vinyl "versatate", vinyl chloride and esters of acrylic and methacrylic acids with monohydric alcohols having 1-18 carbon atoms, for example, methyl acrylate, ethyl acrylate, butyl acrylate, 2-ethyl hexyl acrylate, methyl methacrylate, ethyl methacrylate and n-butyl methacrylate. The film-forming addition polymer may be a single addition polymer or a blend of such polymers. We have found that addition polymers which comprise at least 30% by weight of acrylic monomers, that is, derivatives of acrylic and methacrylic acids, perform especially well when used in our invention and these are our preferred polymers.

At least one addition polymer must comprise a proportion of polar groups which are chosen from amine, ureido and thioureido groups.

The amine group is selected from groups having the general formula

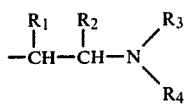

where $R_1$ and $R_2$ are H, $CH_3$ or OH, and $R_3$ and $R_4$ are H or $C_1$-$C_4$ alkyl or hydroxyalkyl groups. These groups may be derived from an ethylenically unsaturated monomer comprising such a group. For example, a group of the formula

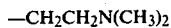

may be provided by incorporating into the polymer a suitable proportion of dimethylaminoethyl methacrylate.

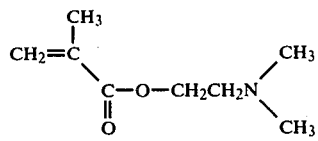

Alternatively, the amine group may be provided by the reaction of a reactive group on the polymer with a compound which bears both a complementary reactive group and an amine group, or a group which is capable of generating the amine group. A very convenient way of providing a suitable amine group is by reacting a carboxyl group on the polymer (provided by, for example, methacrylic acid) with a compound bearing an aziridine group. In this case, the amine group is actually generated during the reaction. A further example of a suitable reaction would be that of an oxirane group on the polymer (provided by, for example, glycidyl methacrylate) with ammonia.

Ureido and thioureido groups are chosen such that a compound which consists of one of these groups and a methacrylyl group has a solubility in water at 25° C. of at least 1% by weight. Thus, a ureido group having the formula

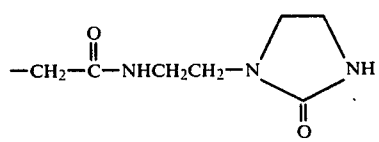

is encompassed by our invention, as a compound consisting of both this group and a methacrylyl group, N-methacryloxyacetamidoethyl-N,N'-ethylene urea

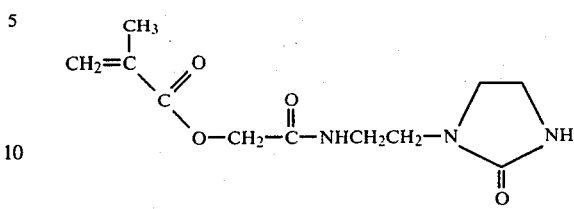

is water-soluble to the required degree. On the other hand, a group of the formula

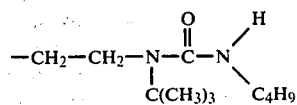

is not encompassed by our invention as the compound consisting of this group and a methacrylyl group, N-t-butyl-N-methacryloxyethyl-N'-butyl urea, is not water soluble to the required degree.

Ureido and thioureido groups may be provided by the incorporation of a suitable ureido or thioureido group-bearing monomer such as that mentioned above into the polymer. Alternatively, they may be provided by, for example, the reaction of a compound comprising both a suitable ureido or thioureido group and a reactive group with a complementary reactive group on the polymer.

At least one film-forming addition polymer must comprise a proportion of a copolymerisable amide monomer which is selected from acrylamide and methacrylamide. We believe, without placing any restrictions on the scope of our invention, that the poly(alkylene oxide) associates in some way with the amide monomer and that this association in combination with the polar groups gives the resultant film-forming dispersions advantageous properties which are not exhibited by dispersions lacking one or more of these three components. It is noteworthy that the replacement of acrylamide or methacrylamide by another polar monomer such as acrylonitrile or methacrylic acid results in a dispersion which does not have the advantageous properties.

The quantities of poly(alkylene oxide), polar groups and amide monomer present must comply with certain limits with respect to the total weight of film-forming disperse polymer. For example, the poly(alkylene oxide) must be present to the extent of at least 0.5% by weight of the film-forming polymer, the polar groups to the extent of at least 0.3% by weight and the amide monomer to the extent of at least 0.3% by weight. Further, the combined weights of the poly(alkylene oxide), the polar groups and the amide monomer must comprise between 1.4% and 9.0% by weight of the film-forming polymer.

We have observed that there is no sharp change at these limits—there is a gradual change in properties as the combined weight percentage is altered—but we have selected these limits because they permit us to formulate aqueous polymer dispersions having both the excellent moisture resistance properties of our invention and acceptable film properties. Our preferred range of combined weight percentages is 1.7%-6%; in this range the optimum properties are achieved.

The poly(alkylene oxide) may be blended with the dispersion of polymer particles, the polymer of which particles comprises the polar groups and amide monomer, but we have found that the best results are achieved if the dispersion of particles of polymer comprising the amide monomer is prepared in the presence of the poly(alkylene oxide). It is permissible to have both the polar groups and the amide monomer incorporated into a single addition polymer or into separate addition polymers which are then blended. Such a single addition polymer or such a blend may be used in the form of an aqueous dispersion of particles as the sole film-forming component of a coating composition, or it may be blended with a conventional aqueous addition polymer dispersion which does not contain such species. For example, an aqueous dispersion of an addition film-forming polymer comprising 2.0% by weight of poly(alkylene oxide), 1.4% of polar groups and 0.6% of the amide monomer will display all the advantages of the present invention not only when used as the sole film-forming component of a coating composition, but also when it is blended with an equal proportion of an otherwise identical dispersion which lacks all three components—in this latter case, the overall individual concentrations of the poly(alkylene oxide) the polar group and the amide monomer are 1.0% and 0.7% and 0.3% respectively and their total is 2.0%, all of which fall within the limits as hereinabove defined.

The aqueous dispersions of polymer particles of this invention may be prepared using processes and techniques well known to the art. Additives such as thickening agents, surfactants and stabilisers which are commonly used in such processes may be used in art-recognised quantities in the preparation of aqueous dispersions according to the invention. These dispersions may be incorporated directly into coating compositions by conventional means, and normal paint ingredients such as pigments, extenders and thickeners may be incorporated in art-recognised quantities in the conventional manner.

The use of our invention enables persons skilled in the art to prepare aqueous dispersions exhibiting commercially acceptable moisture resistance properties using levels of polar groups which are too low according to the normal practices of the art. This may represent a substantial cost saving as the need for increased use of expensive polar group-containing compounds is removed. Many of these polar groups, notably those derived from aziridine groups, have a marked tendency to cause "yellowing" of compositions in which they are included. The reduction of the number of polar groups required for good wet adhesion will also lead to a reduction in yellowing tendencies. Alternatively, the invention may be used to enhance further the moisture resistance properties of a polar group-containing polymer dispersion already exhibiting good moisture resistance properties. It is a feature of our invention that paint compositions incorporating aqueous polymer dispersions according to our invention exhibit very good moisture resistance properties, often at least equal and even superior to those of the best of the currently available commercial compositions.

The invention is further illustrated by the following examples in which all parts are expressed by weight.

EXAMPLE 1

Preparation of an aqueous dispersion of film-forming addition polymer which comprises 0.68% by weight of amine groups, 0.5% by weight of amide monomer and 1.0% by weight of poly(alkylene oxide).

(a) Preparation of dispersion

The following materials and quantities were used;

| | | | |
|---|---|---|---|
| A | Distilled water | 208.08 | parts |
| | Non-ionic low foaming surfactant (poly(ethylene oxide-propylene oxide) adduct)* | 3.31 | |
| | Hydroxy ethyl cellulose (low viscosity grade) | 2.04 | |
| | Poly(ethylene glycol) (molecular weight 4,000) | 4.84 | |
| B | Distilled water | 191.06 | |
| | Sodium dodecyl benzene sulphonate surfactant** | 1.87 | |
| | Sodium dicyclohexyl sulphosuccinate surfactant *** | 0.93 | |
| | Non-ionic octyl phenol ethoxylate surfactant + | 3.31 | |
| | Methyl methacrylate | 262.32 | |
| | Butyl acrylate | 217.71 | |
| | t-dodecyl mercaptan | 0.97 | |
| *for example. "Teric-38 -0 PE64 (trade mark) | | | |
| **for example. "Spionate" DS-10 (trade mark) | | | |
| *** for example. "Aerosol" A-196 (trade mark) | | | |
| +for example, "Triton" X-405 (trade mark) | | | |
| | 0.880 ammonia solution | 2.43 | parts |
| | Acrylamide | 2.43 | |
| C | Dimethyl aminoethyl methacrylate | 7.30 | |
| D | Distilled water | 3.11 | |
| | Ammonium persulphate | 0.97 | |
| E | Distilled water | 3.11 | |
| | Ammonium persulphate | 0.68 | |
| | 4% of B | 27.23 | |
| F | Distilled water | 0.49 | |
| | Ammonium persulphate | 0.08 | |
| G | Distilled water | 64.42 | |
| | Bactericide | 0.08 | |

The procedure was as follows:

The materials A were charged to a reaction vessel equipped with a heating mantle, stirrer and means for passing nitrogen. The vessel was heated with continuous agitation to 78° C. (at which temperature it was held throughout the reaction) and the passing of nitrogen was started. The materials D were added followed 15 minutes later by the materials E. After a further 15 minutes, 80% of the remaining materials B was continuously fed into the reaction mixture over a period of 2½ hours. The remaining 20% of the materials B was then blended with the materials C and this blend continuously added over a period of 35 minutes. The materials F were added 30 minutes after the completion of the addition of the blend. The reaction mixture was allowed to agitate for a further 30 minutes and then cooled to about 32° C., at which point the materials G were added and the mixture allowed to cool to room temperature.

The resultant composition was a white aqueous dispersion of weight solids content 50.7%.

EXAMPLE 2

Comparative testing of the aqueous dispersion of Example 1.

Two types of testing were used, a wet adhesion test and a humidity test.

Wet Adhesion Test

The test method used was as follows:

(i) a panel of hardboard was primed and sprayed with an alkyd enamel;

(ii) the panel was allowed to dry for three days and then baked overnight at 65° C.

(iii) a 175 μm film of a mixture of aqueous dispersion and tri-n-butyl phosphate (added at the rate of 2.8 g per 100 g dispersion) was drawn down on the panel and air dried for 24 hours.

(iv) the film was scribed with a single longitudinal scribe and then cross-scribed on this scribe;

(v) the panel was immersed in water for an hour and withdrawn, excess water was wiped off, adhesive tape was applied to the cross-scribes and then immediately pulled off. The result was visually rated on a scale of from 1 to 5 where 5 represents no removal of film and 1 represents removal of the film over the entire area of contact of the tape.

Humidity Test

Panels prepared according to steps (i)–(iii) of the wet adhesion test were suspended vertically in a humidity cabinet at 38° C. and 100% humidity for 2 weeks. The films were assessed for whitening (believed to be caused by the formation of water droplets within the film) blistering and gloss—an ideal panel should exhibit no whitening, no blistering and no loss of gloss.

The aqueous addition polymer dispersion prepared in Example 1 was subjected to these tests along with the following dispersions;

(a) an otherwise identical aqueous dispersion lacking poly(alkylene oxide) chains.

(b) an otherwise identical aqueous dispersion lacking polar groups;

(c) an otherwise identical aqueous dispersion lacking amide monomer;

(d) an otherwise identical aqueous dispersion lacking both amide monomer and poly(alkylene oxide) chains;

(e) a commercially available aqueous acrylic dispersion (the dispersion used was AC508 (ex Rohm & Haas Co.) a proprietary acrylic latex of 46.5% solids)

The results of the testing are given in the following table—the gloss of all films prior to humidity testing was rated as "good"

|  | Wet Adhesion testing | Humidity Performance | | |
| --- | --- | --- | --- | --- |
|  |  | Whitening | Blistering | Gloss |
| Dispersion according to the invention | 5 | None | None | good |
| Dispersion (a) | 2 | V.white | 50% of surface | v. poor |
| Dispersion (b) | 1* | V.white | 50% of surface | good |
| Dispersion (c) | 2 | V.white | 50% of surfaceS | v. poor |
| Dispersion (d) | 2 | V.white | 80% of surface | v. poor |
| Dispersion (e) | 4 | V. white | None | fair |

*In this case, the entire latex film peeled off, not only that part contacted by the tape.

It can readily be seen that the dispersion comprising a combination of polar groups, amide monomer and poly(alkylene oxide) chains gave results which were better than those obtained from a good commercial aqueous dispersion and superior to those of dispersions lacking one or more of these essential elements.

EXAMPLE 3

The effect of blending two aqueous dispersions of polymer particles, the polymer of one dispersion comprising 1.37% by weight of polar groups, the polymer of the other comprising 2% by weight poly(alkylene oxide) chains and 1% by weight of amide monomer.

Two aqueous dispersions were prepared according to the method and using the materials of Example 1 except that one dispersion comprised 1.37% by weight of polar groups and no poly(ethylene oxide) chains or amide monomer, and the other dispersion 2% by weight poly(ethylene oxide) chains, 1% by weight of amide monomer and no polar groups. The dispersions were blended in equal weight proportions and tested as described in Example 2. The blend exhibited the same excellent properties as the aqueous dispersion prepared in Example 1.

EXAMPLE 4

Demonstration of the necessity for adhering to the stated parameters.

A number of aqueous addition polymer dispersions were prepared according to the method of Example 1 in which the proportions of polar groups, amide monomer and poly(alkylene oxide) chains (expressed as a percentage by weight of the polymer) were varied. The resultant aqueous dispersions were subjected to the adhesion test described in Example 2 and the results are shown in the following table.

| Dispersion No. | % polar groups | % Amide monomer | poly(alkylene oxide) chains % | Total % amide monomer polar groups & chains | Wet Adhesion Rating |
| --- | --- | --- | --- | --- | --- |
| 1 | 0.23 | 0.5 | 1.0 | 1.73 | 1 |
| 2 | 0.46 | 0.1 | 1.0 | 1.56 | 1 |
| 3 | 0.46 | 0.3 | 0.3 | 1.06 | 1 |
| 4 | 0.46 | 0.3 | 0.5 | 1.26 | 2 |
| 5 | 0.46 | 0.5 | 0.5 | 1.46 | 3 |
| 6 | 0.57 | 0.25 | 1.0 | 1.82 | 4 |
| 7 | 0.46 | 0.3 | 1.0 | 1.76 | 5 |
| 8 | 0.68 | 0.5 | 1.0 | 2.18 | 5 |
| 9 | 0.68 | 1.0 | 1.0 | 2.68 | 5 |
| 10 | 0.91 | 1.5 | 3.0 | 5.41 | 5 |
| 11 | 2.28 | 1.0 | 5.0 | 8.78 | 4 |

It can readily be seen that a dispersion which has a proportion of polar groups, amide monomer or poly(alkylene oxide) chains lower than the specified limits of 0.3%, 0.3% and 0.5% respectively (dispersions nos. 1, 2 and 3 respectively), or which has a total proportion of polar groups, amide monomer and poly(alkylene oxide) chains lower than the specified limit of 1.4% (dispersion no. 4), will give a relatively poor wet adhesion result. A borderline case such as Dispersion 5 will give an improved result and Dispersions 7–10, which lie within the preferred total proportion range of 1.7%–6%, all show excellent wet adhesion results. The wet adhesion properties of Dispersion 11, which has a total proportion of polar groups and poly(alkylene oxide) chains lying within the scope of the invention but outside the preferred range, show some falling-off relative to those of the dispersions lying within the preferred range, but still remain very good.

EXAMPLE 5

This example illustrates the use of different polar groups.

This example illustrates the use of different polar groups.

A number of aqueous addition polymer dispersions were prepared according to Example 1 substituting appropriate quantities of the following monomers for the dimethylaminoethyl methacrylate such that the quantities of polar groups in all cases were equivalent to that of Example 1.

(a) t-butylaminoethyl methacrylate;
(b) N-methacryloxyacetamidoethyl-N,N'-ethylene urea;
(c) N-t-butyl-N-methacryloxyethyl-N'-butyl urea;
where
  monomers (a) and (b) lie within the scope of the invention; and
  monomer (c) is a ureido group-containing monomer which is not water soluble to the required extent of 1% at 25° C.

The dispersions prepared therefrom were subjected to the wet adhesion test as described in Example 2 and the results were as follows:

| Monomer | Wet Adhesion Rating |
|---------|---------------------|
| (a)     | 5                   |
| (b)     | 5                   |
| (c)     | 2                   |

It is readily apparent that only the polar monomers according to the invention give desirable results.

EXAMPLE 6

Preparation of an aqueous polymer dispersion wherein the polymer comprises 1% by weight of poly(ethylene oxide) chains (molecular weight 4,000), 0.5% by weight of amide monomer, and 0.68% by weight of polar groups provided by the reaction of carboxyl groups on the polymer with a compound bearing an aziridine group.

(a) Preparation of dispersion

The materials and quantities and procedures used in this preparation were identical to those of Example 1 except that an identical weight of methacrylic acid was substituted for the dimethylaminoethyl methacrylate.

The resulting aqueous dispersion had a solids content of 50.5%.

(b) Provision of polar groups

The materials used were as follows;
Aqueous dispersion (as prepared above): 700 parts
1,2-propyleneimine: 6.9 parts The 1,2-propyleneimine was added gradually with stirring to the aqueous dispersion at room temperature. Stirring was continued for an hour after which the temperature was raised to 80° C., held there for a further 1½ hours, and then cooled slowly.

The resulting aqueous dispersion had a solids content of 51.2% and no free imine.

(c) Testing

Imine groups are known to be excellent as adhesion promoters, but they are also known to confer "yellowing" characteristics on dispersions in which they are incorporated. It was believed that the use of polar groups derived from imines in conjunction with poly(ethylene oxide) chains would permit the use of a lower concentration of imine-derived polar groups than was normally acceptable for good adhesion and still permit the production of dispersions with both acceptable humidity performance and lowered yellowing tendencies. To this end, a "blank" aqueous dispersion was prepared as described in section (a) above, but omitting the poly(ethylene oxide) chains, amide monomer and methacrylic acid, and this was used to dilute the iminated dispersion at a rate of 50 parts of "blank" to 50 parts of dispersion according to the invention.

A "control" dispersion was prepared according to sections (a) and (b) above, but the poly(ethylene oxide) chains and amide monomer were omitted. This was tested in two forms, undiluted and diluted 50/50 with "blank".

The testing methods were those used in Example 2 except that in the humidity test, the films were assessed for yellowing rather than whitening.

The results are summarised in the following table;

|  | Wet adhesion rating | Humidity Performance | | |
|---|---|---|---|---|
|  |  | Yellowing | Blistering | Gloss |
| Dispersion according to the invention | 5 | Considerable | none | good |
| "Control" dispersion | 4 | Considerable | none | fair |
| Dispersion according to the invention diluted 50/50 with "blank" dispersion | 3 | Slight | 5% of surface | good |
| "Control" dispersion diluted 50/50 with "blank" dispersion | 2 | Slight | 5% of surface | poor |

The table shows that although the dispersion according to the invention has excellent blistering resistance, gloss retention and wet adhesion, it is very prone to yellowing. The diluted dispersion according to the invention does not show the same excellent properties but the properties remain commercially acceptable and the diluted sample does not have the undesirable yellowing of the undiluted dispersion. Both of these dispersions are superior to the respective "control" dispersions which do not have poly(ethylene oxide) chains.

EXAMPLE 7

Demonstration of the effect of changing the nature of the poly(alkylene oxide) chains.

Several aqueous dispersions were prepared and tested using the materials, quantities and method of Examples 1 and 2 except that in each case the poly(ethylene oxide) chains were substituted by an amount of one of the following materials such that the dispersions contained 1% by weight of poly(alkylene oxide) chains;

|  | Wet Adhesion Rating | Humidity Performance | | |
|---|---|---|---|---|
|  |  | Whitening | Blistering | Gloss |
| Poly(ethylene oxide) (Molecular wt. 600) | 2 | some | 20% of surface | fair |
| Methoxypoly(ethylene oxide) (Molecular wt 750) | 2 | some | 20% of | fair |
| Poly(ethylene oxide) (Molecular wt 4,000) | 5 | none | none | good |
| Poly(ethylene oxide) (Molecular wt 6,000) | 5 | none | none | good |
| Poly(ethylene oxide/propylene oxide) (Molecular wt 4,100) | 5 | none | none | good |
| Non-ionic surfactant* comprising about 40 ethylene units (poly(ethylene oxide) molecular wt about 1,760) | 1 | severe | 100% of surface | very poor |

*A commercial material "Triton X-405" was used ("Triton" is a trade mark)

It can readily be seen from this example that those poly(ethylene oxide) chains having a molecular weight below about 1000 (about 30 ethylene oxide units) give poor adhesion. In addition, the commercial surfactant, which comprises a poly(ethylene oxide) chain of the correct size is the worst performer of all. Only those poly(alkylene oxide) chains which comply with the invention give satisfactory performance.

EXAMPLE 8

Preparation of a non-acrylic aqueous dispersion according to the invention.

An aqueous dispersion of a copolymer of vinyl acetate and butyl acrylate in the ratio 80:20 was prepared in the presence of hydroxyethyl cellulose protective colloid and anionic surfactant using methods known to the art. In addition, the polymer comprised 1.37% polar groups (derived from dimethylaminoethyl methacrylate), 1% amide monomer (acrylamide) and 2% poly(ethylene oxide) chains of molecular weight 4000. The dispersion had a weight solids content of 59.0%.

This dispersion was subjected to the wet adhesion test of Example 2 together with two similar dispersions, one lacking amide monomer and poly(ethylene oxide) chains and the other lacking polar groups, amide monomer and poly(ethylene oxide) chains, the latter of course being a conventional poly(vinylacetate/butyl acrylate) dispersion of the type widely used in the art.

|  | Wet Adhesion Rating |
|---|---|
| Dispersion according to invention | 5 |
| Dispersion lacking acrylamide and poly(ethylene oxide) chains | 2 |
| Dispersion lacking acrylamide, polar groups and poly(ethylene oxide) chains | 2 |

The aqueous dispersion according to the invention gave results superior to those given by either of the two comparative dispersions.

EXAMPLE 9

Preparation and comparative testing of a coating composition comprising an aqueous dispersion according to the invention.

The coating composition prepared was a gloss white formulation for exterior use.

A base was prepared by blending the following materials until pigment dispersion was complete.

| Water | 11.54 parts |
|---|---|
| Sodium hexametaphosphate | 0.38 |
| Titanium dioxide pigment | 23.00 |
| Hydroxyethyl cellulose | 0.14 |
| Tributyl phosphate | 1.58 |

The following materials were then blended to give a coating composition.

| Base (as prepared above) | 41.90 parts |
|---|---|
| Aqueous dispersion (from example 1) | 52.33 " |
| Water | 5.77 " |
|  | 100.00 |

The base was also used to prepare in an identical manner, coating compositions from the aqueous dispersions (d) and (e) of Example 2, the water quantity being adjusted to give 100 parts.

The coating compositions were subjected to the wet adhesion test of Example 2. The compositions based on aqueous dispersions (d) and (e) of Example 2 failed over most of the area contacted by the tape but the composition based on the aqueous dispersion according to the invention showed no failure.

We claim:

1. An aqueous dispersion of particles of at least one film-forming addition polymer of α,β-ethylenically unsaturated monomer at least one of which polymers comprises a proportion of polar groups selected from the group consisting of amine, ureido and thioureido groups, and characterised in that
   (a) the polar groups are chosen as follows;
      (i) the amine groups correspond to the general formula

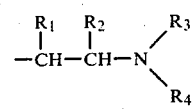

where
   $R_1$, $R_2$ are H, $CH_3$ or OH
   $R_3$, $R_4$ are H or $C_1$-$C_4$ alkyl or hydroxyalkyl groups;
      (ii) the ureido or thioureido groups are such that the solubility in water of a compound consisting of such a group attached directly to a methacrylyl group is at least 1% by weight at 25° C.;
   (b) at least one film-forming addition polymer comprises a proportion of copolymerisable amide monomer units selected from the group consisting of acrylamide and methacrylamide; and
   (c) the aqueous dispersion comprises a proportion of poly(alkylene oxide), the poly(alkylene oxide) being soluble in water and having at least 30 ethylene oxide units per molecule
and further characterised in that
   (d) there is present in the dispersion at least 0.5% by weight of the total film-forming polymer of the poly(alkylene oxide) at least 0.3% of the polar groups and at least 0.3% by weight of the amide monomer units; and,
   (e) the combined weights of the poly(alkylene oxide), the polar groups and the amide monomer units comprise from 1.4-9.0% by weight of the total weight of the film-forming polymer and poly(alkylene oxide).

2. An aqueous dispersion of addition polymer particles according to claim 1, characterised in that the polar groups in the polymer are provided by the incorporation in the polymer of α,β-ethylenically unsaturated monomer bearing such groups.

3. An aqueous dispersion of addition polymer particles according to claim 1, characterised in that the polar groups in the polymer are provided by the reaction of reactive groups on the polymer with a compound bearing a complementary reactive group and in addition which bears or is capable of generating such a polar group.

4. An aqueous dispersion of addition polymer particles according to claim 2, characterised in that the monomer is chosen from the group consisting of dimethylaminoethyl methacrylate, t-aminoethyl butyl methacrylate and N-methacryloxyacetamidoethyl-N,N'-ethyl urea.

5. An aqueous dispersion of addition polymer particles according to claim 3, characterised in that the reactive groups on the polymer are carboxyl groups and the compound bears an aziridine group.

6. An aqueous dispersion of addition polymer particles according to claim 1, characterised in that the addition polymer comprises at least 30% by weight of acrylic and methacrylic monomer units.

7. An aqueous dispersion of addition polymer particles according to claim 1, characterised in that the combined weight of polar groups, amide monomer units and poly(alkylene oxide) chains comprises from 1.7%–6% of the total weight of the film-forming addition polymer and poly(alkylene oxide).

* * * * *